Dec. 19, 1967 P. A. SUTO 3,358,916
AXONOMETRIC DRAWING GUIDE
Filed Oct. 24, 1966 5 Sheets-Sheet 2

INVENTOR.
PAUL A. SUTO
BY
Fishman & Van Kirk
ATTORNEYS.

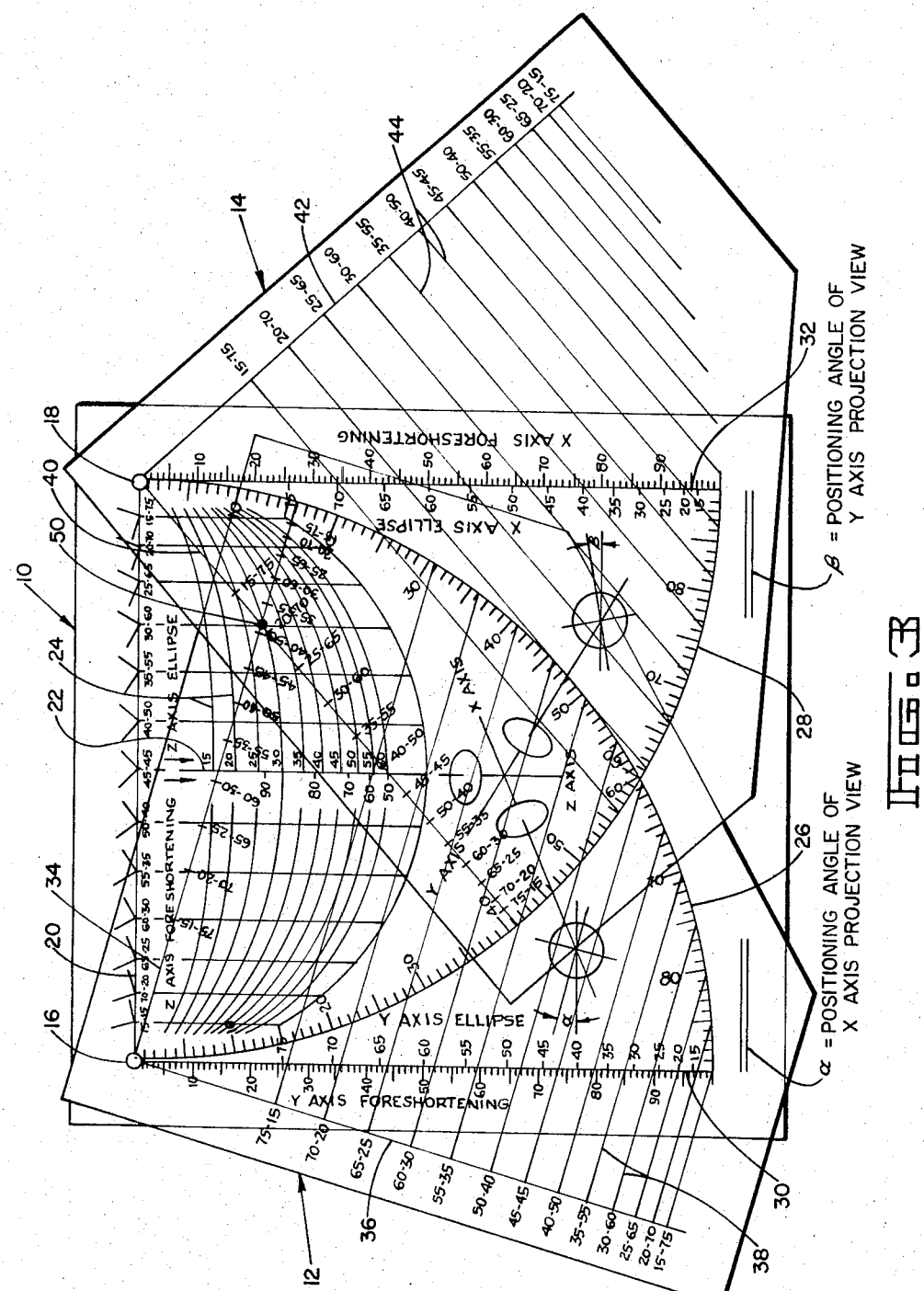

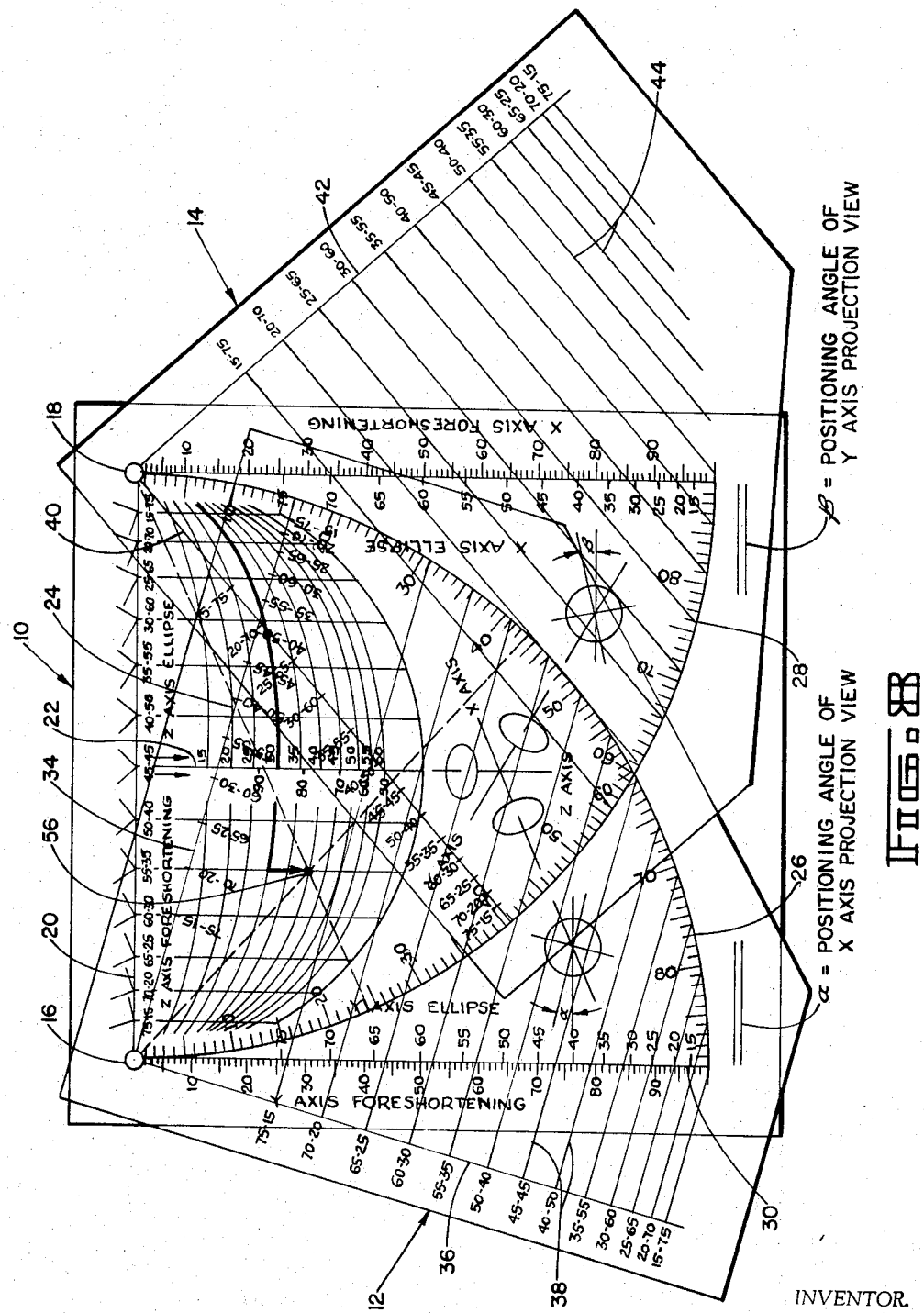

United States Patent Office 3,358,916
Patented Dec. 19, 1967

3,358,916
AXONOMETRIC DRAWING GUIDE
Paul A. Suto, Windsor, Conn., assignor to United Aircraft Corporation, East Hartford, Conn., a corporation of Delaware
Filed Oct. 24, 1966, Ser. No. 588,788
9 Claims. (Cl. 235—89)

This invention relates to the preparation of three-dimensional drawings. More particularly, the present invention is directed to an axonometric drawing guide. Accordingly, the general objects of the present invention are to provide new and useful methods and apparatus of such character.

Three dimensional drawing has been established as not only an aid but as an essential tool in transmitting technical information in all phases of industry. Three dimensional drawing is used in the production of external, exploded and cut-away views for instruction manuals, catalogs, engineering reports, proposals and advertising literature. Such drawings are also used in production illustrations and operation sheets for supplementing and clarifying conventional working drawings.

There are several mechanical systems of three dimensional drawing which exhibit varying degrees of faithfulness to photographic truth. These systems are commonly identified as three-point perspective, two-point perspective, one-point perspective and axonometric drawing. All four techniques or systems require familiarity with mechanical drawing and the existance or preparation of orthographic views of the object to be drawn.

Axonometric drawing is particularly well suited to industrial illustration because of its simplicity and consistancy of scales and angles. Accordingly, the discussion to follow will concentrate on axonometric drawing. However, it is to be understood that the principles and methods to be described apply equally readily to two and three point perspective drawing.

The objective of three dimensional drawing is to produce a single drawing showing top, front and side of an object in a single picture or figure. The top, front and side of an object are, of course, the views which are generally shown in orthographic projection. Orthographic projection assumes the existance of a cube with transparent surfaces and the object placed inside with its main surfaces parallel to the faces of the cube. The various views are obtained by the projecting points of the object perpendicularly upon the faces of the cube. Folding out the surfaces of the cube into one flat plane results in the conventional orthographic working drawing. By viewing the cube, or more correctly the object, at an oblique angle, and establishing a plane perpendicular to the line of sight, all points of the object may be projected perpendicularly onto such plane (the picture plane). In this case the three faces of the cube are rotated on the traces formed by the oblique picture plane with the faces of the cube, into the plane of the picture plane. By projecting points of orthographic views perpendicularly onto and through the respective traces, a three dimensional picture is formed.

To make an axonometric drawing from a set of orthographic drawings at any particular chosen angle of view, it is necessary to determine the angles of the three major axes, the percentage of foreshortening of these axes, the degrees of ellipses associated with each axis and, for projection, the required positioning angle of the orthographic views. In the prior art these determinations were made by a series of tedious construction steps or by reference to a book of construction steps and computer generated tables. Such tables are not generally available for public consumption. The present invention overcomes the above discussed disadvantages by providing all the above mentioned data by reading settings off a simple hand held calculator.

It is therefore an object of the present invention to facilitate the preparation of three dimensional drawings.

It is another object of the present invention to provide an axonometric drawing guide.

It is a further object of the present invention to provide an axonometric drawing guide which is easy to use thus facilitating the preparation of three dimensional drawings.

It is also an object of the present invention to provide an inexpensive axonometric drawing guide which may be widely distributed.

It is yet another object of the present invention to provide an instrument which facilitates the production of three dimensional drawings by presenting sufficient information in easy to read form to enable preparation of a three dimensional drawing rapidly and easily.

These and other objects of the present invention are accomplished by a hand-held calculator comprising a base member and a pair of transparent overlays pivotably attached thereto. The base member carries data and scales relating to the horizontal angle of view of the object, the percent of foreshortening of the axes of the object, the angle of the axes ellipses, the angles of view of the front and sides of object and a family of curves which, in cooperation with the horizontal angles of view, enable both the Z axis ellipse and Z axis foreshortening to be determined. In operation, the artist chooses the side of the object he wishes to emphasize and then selects the angle of rotation (horizontal angle of view). The transparent overlays are then adjusted such that their axes intersect indica corresponding to the selected horizontal angle of view at a selected angle for the Z axis ellipse. From this initial setting, data may be obtained relating to the angles of the $x$ and $y$ axis, the $x$ and $y$ ellipses and the $x$, $y$ and $z$ axis foreshortening. Thereafter, by means of readjustment of the overlays, the positioning angles of the side views may be obtained. If there are portions of the object at odd angles, another setting of the overlays may be used to obtain the ellipse angles and foreshortening data necessary to properly construct the three dimensional view of such a portion.

The present inevntion may be better understood and its various advantages will be apparent to those skilled in the art by reference to the accompanying drawing wherein like reference numerals refer to like elements in the various figures and in which:

FIGURE 3 depicts the preferred embodiment of the present invention shown in FIGURE 1 as adjusted to a first position to provide data for preparation of a three-dimensional drawing.

FIGURE 8 depicts the preferred embodiment of the present invention, as shown in FIGURE 1, adjusted to a third position to provide foreshortening and ellipse angle data to enable proper construction of the odd angle portion of the object shown in FIGURE 7.

Figure 1:
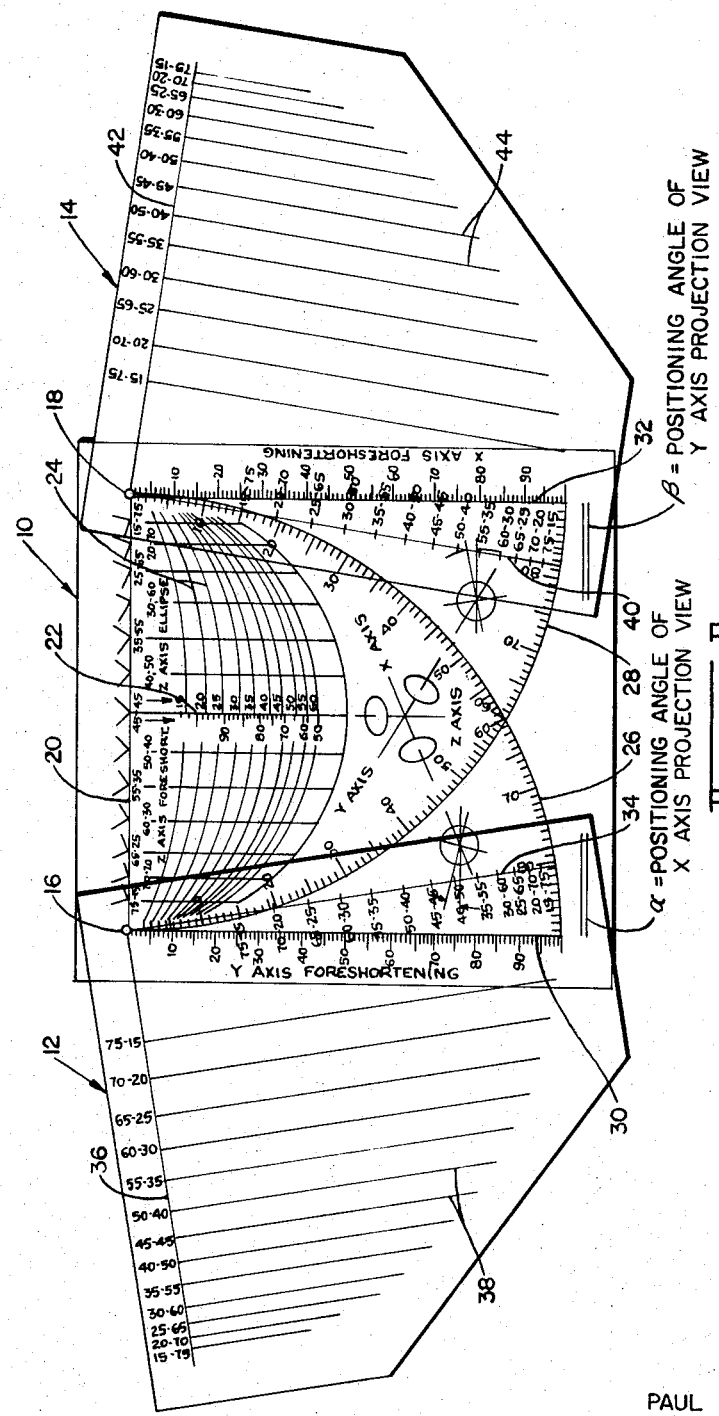
FIGURE 1 is a plan view of a preferred embodiment of the drawing guide of the present invention.

Referring now to FIGURE 1, the present invention comprises a base member or panel shown generally at 10 and a pair of transparent overlays shown generally at 12 and 14. Overlays 12 and 14 are respectively pivotably connected to base member 10 by means of rivets or other suitable means at pivot points 16 and 18. Members 10, 12 and 14 are preferably fabricated from a plastic material.

Member 10 carries a plurality of scales and other indicia which are preferably imprinted thereon. A first one of these scales, indicated at 20, extends between pivot points 16 and 18 and contains data pertaining to the horizontal angle of view of the object. The horizontal angle of view, a–b, as may be seen from FIGURE 2, determines the positioning of the top view of the object which positioning is given by angles a and b. Reading left to right on scale 20, angle a is the first of each pair of angles given. As will become apparent from the discussion below, scale 20 also constitutes the major axis of a plurality of ellipses.

Extending downwardly from scale 20 are a plurality of equally spaced vertical lines corresponding to increments of 5° along scale 20. Centrally disposed vertical line 22, corresponding to a horizontal angle of view of 45°–45° is graduated and contains, printed to the left of the line, data relating to the percent of Z axis foreshortening. Intersecting line 22 is a family of elliptical curves 24. As will be described below, curves 24 are drawn such that line 22 comprises the minor axis of the ellipses which would be in part comprised by each of curves 24 while, as indicated above, scale 20 comprises the major axis of such ellipses. In constructing the embodiment of FIGURE 1, curves 24 are drawn using standard ellipse guides placed so that their centers are located at the 45°–45° mark on scale 20. The degree of foreshortening thus becomes the cosine of the ellipse angles of each of the ellipses forming family of curves 24. For reasons of practicality, the embodiment of the present invention being described has been designed for use with ellipse guides of angles which are readily available (15° to 60° in 5° increments). However, if desired, other angles can be determined by interpolation or could be shown on the scale.

Base member 10 is also provided with a pair of protractor scales 26 and 28. Scales 26 and 28 are formed by striking arcs from pivot points 16 and 18 respectively. A pair of vertical scales 30 and 32 respectively extend between pivot points 16 and 18 and ends of arcs 26 and 28. Scales 30 and 32 are calibrated so as to provide indication of the percent of foreshortening of the y and x axis respectively and also to provide data concerning the y and x axis ellipse angles. The foreshortening information is to the outside of lines 30 and 32 whereas the ellipse angle information is to the inside of the lines. In the interests of clarity, the ellipse angle information has been omitted from FIGURE 1 but may clearly be seen from FIGURE 3. As with the z axis foreshortening scale, the x and y axis foreshortening corresponds to the cosine of the corresponding ellipse angles. The spacing of the ellipse angle indicia on lines 30 and 32 is determined by projecting horizontally the evenly spaced angular information from protractor scales 26 and 28 to vertical lines 30 and 32; the ellipse angles corresponding to the complement of the horizontally displaced angles on the protractor scales.

Overlay 12, which is the y overlay, carries a y axis scale 34 which extends from pivot point 16. Also extending from pivot point 16 in a direction perpendicular to scale 34 is a scale 36. Extending from scale 36 parallel to scale 34 are a plurality of lines 38. Lines 38 are spaced in accordance with the spacing of the indicia on scale 36 which spacing is determined in the same manner that the y axis ellipse information is defined on scale 30. The indicia on scale 34 is laid out in the same manner as the indicia on scale 36 and both relate to the horizontal angle of view.

Overlay 14, which is the x axis overlay, carries a pair of scales 40 and 42 which are perpendicular to one another and which extend from pivot point 18. The indicia on scales 40 and 42 is positioned in the same manner as above described in relation to the y overlay with the exception that the angles are reversed. X overlay 14 also has a plurality of parallel lines 44 extending outwardly from scale 42 and parallel to scale 40.

Figure 2:
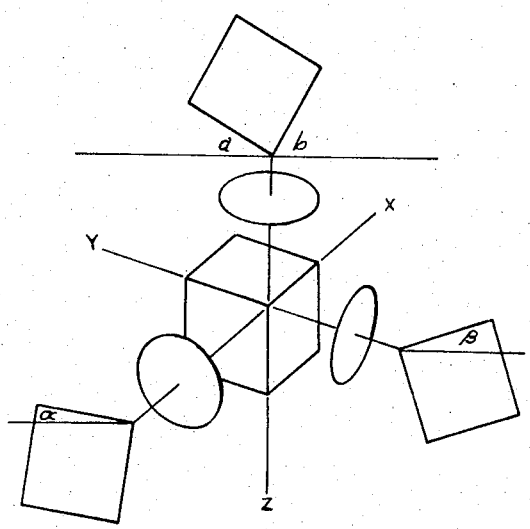
FIGURE 2 is a representation which depicts the various data needed to construct an axonometric drawing of an object.

In use, the artist decides which surface of the object to be depicted is the most interesting or informative (the side he desires to emphasize in the three dimensional view due to its unique characteristics). Once this side has been selected, a horizontal angle of view is chosen. Referring to FIGURE 2, the horizontal angle of view is defined by angles a and b. The artist must also chose the angle of the Z axis ellipse. With the foregoing data selected, the instrument comprising the present invention is adjusted as shown in FIGURE 3. FIGURE 3 presumes a choice of a horizontal angle of view of 30°–60° and a Z axis ellipse angle of 30°. The overlays are adjusted such that scale 40 of overlay 14 and scale 34 of overlay 12 intersect at the point where the 30° ellipse curve of family of curves 24 intercepts the vertical line extending from scale 20 and corresponding to the selected horizontal angle of view (30°–60°). In FIGURE 3 this point is indicated at 50. With the instrument so positioned, the following data must be read directly off the scales indicated:

Z axis foreshortening: intersection of 30° Z axis ellipse curve with vertical axis 22 (86.3%).

X axis foreshortening: intersection of line extending from 30°–60° point on scale 42 with scale 32 (66.6%).

Y axis foreshortening: intersection of line extending from 30°–60° point on scale 36 with scale 30 (90%).

X axis angle (angle of FIGURE 2): intersection of scale 23 on overlay 12 with protractor scale 26 (16°).

Y axis angle (angle B of FIGURE 2): intersection of scale 40 of overlay 14 with protractor scale 28 (41°).

Angle of X axis ellipse: determined in same manner as X axis foreshortening (48°).

Angle of Y axis ellipse: determined in same manner as Y axis foreshortening (25°).

Figure 4:
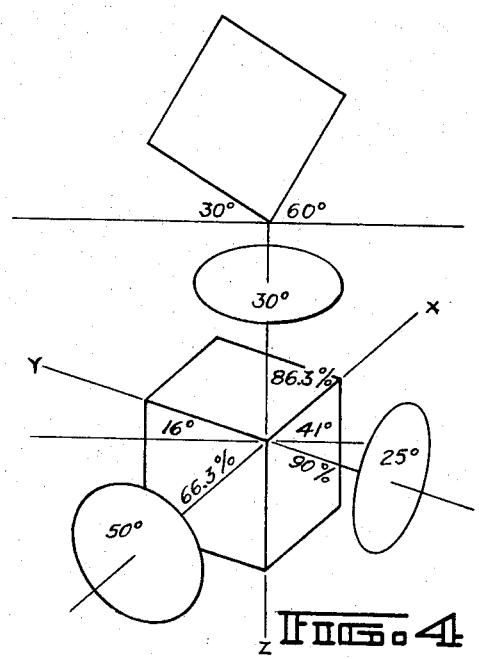
FIGURE 4 represents the information obtainable from the setting of the present invention as shown in FIGURE 3.

The data available through a single setting of the present invention is depicted in FIGURE 4. As will be obvious to those skilled in the art, the data shown in FIGURE 4 is sufficient to enable a preparation of a three dimensional drawing of an object by consrtuction techniques. If, however, it is desired to produce the three dimensional drawing from available orthographic views by projection techniques, positioning angles for the x and y axis projection views must be determined. The positioning angles correspond to angles α and β of FIGURE 2 but will be of different magnitude from the x and y axis angles previously determined.

Figure 5:
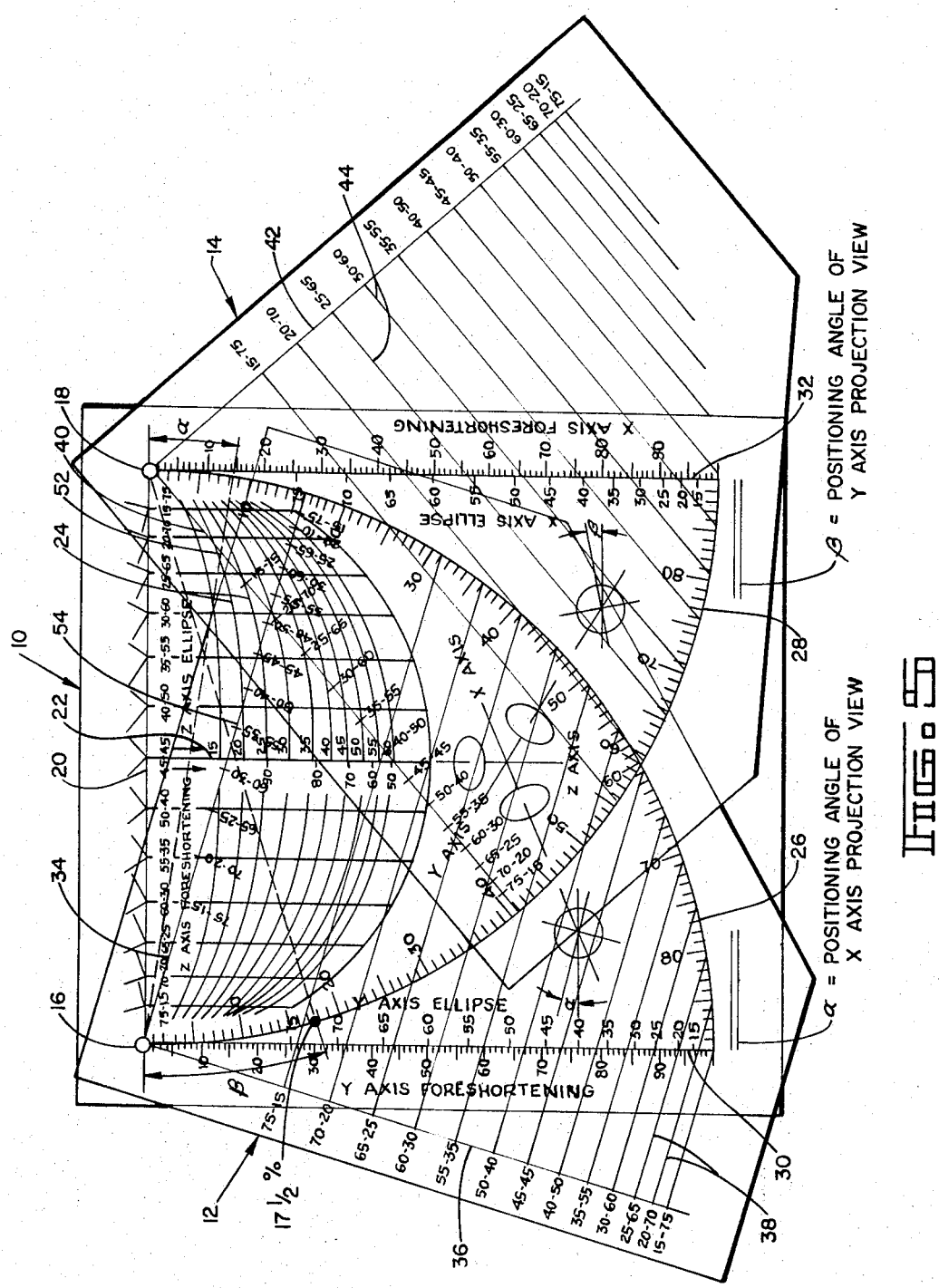
FIGURE 5 depicts the prefered embodiment of the present invention, as shown in FIGURE 1, as adjusted to provide data for preparation of a three dimensional drawing additional to that provided by the FIGURE 3 setting and in accordance with the preselected conditions of FIGURES 3 and 4.

In order to determine the positioning angles, the procedure depicted in FIGURE 5 is followed. The 30°–60° point on x axis scale 34 is located and overlay 12 is rotated until this point intersects y axis scale 40 on overlay 14 at point 52. The point of intersection of scale 34 with protractor scale 26 then gives the x axis or side positioning angle of 8.5°.

Figure 6:
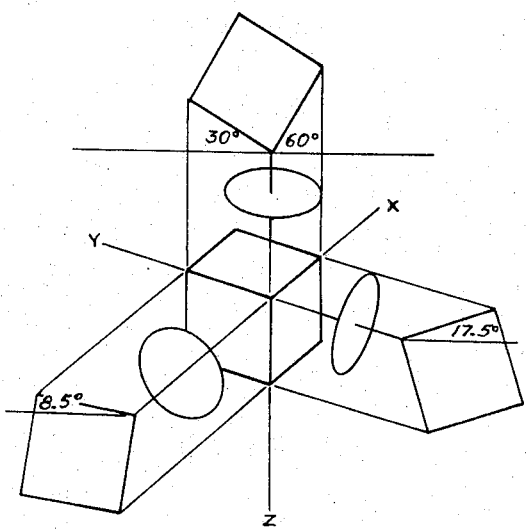
FIGURE 6 is a representation of the preparation of a three dimensional drawing by projection techniques employing information contained from use of the present invention as depicted in FIGURES 3 and 5.

To obtain the y axis or side positioning angle, the scales are returned to their original (FIGURE 3) position. The 30°–60° point on y axis scale 40 is located and the overlay is rotated until this point intersects the x axis scale 34 on overlay 12 at point 54. The intersection of the y axis scale 40 with protractor scale 28 then gives the x axis or side positioning angle of 17.5°. The projection angles are shown on FIGURE 6 and, in conjunction with the data from FIGURE 4, enable a three dimensional drawing to be constructed by projection techniques rapidly and accurately through use of the present invention.

Figure 7:
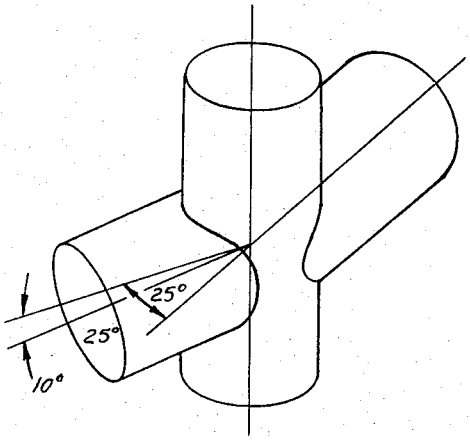
FIGURE 7 shows an object having a portion at odd angles to the viewing axis.

Quite often, the object to be depicted in a three dimensional drawing has either recesses or holes therein or elements protruding therefrom at odd angles (angles other than the $x$ and $y$ axis angles). Such an object is shown in FIGURE 7. In order to obtain the angles of the $x$ and $y$ axis ellipses and the $x$ and $y$ axis foreshortening for such depressions or protrusions, the procedure depicted in FIGURE 8 is followed. In the example being described, the protrusion has an axis which is oriented 25° clockwise from the $y$ axis and which pitches down at an angle of 10°. By incorporating the 25°, a new reference axis for vertical line corresponding to the 55°–35° point on scale 20 is determined. Overlays 12 and 14 are rotated such that their respective axis (scales 34 and 40) intersect at the 55°–35° vertical line and the 40° $z$ axis ellipse line (the 10° pitch being added to the $z$ axis ellipse angle). With this new point 56 established, all data necessary to construct a proper three dimensional view of the element can be determined in the same manner as above described in relation to FIGURES 3 and 5. That is, a new $x$ axis of 24° and a $y$ axis of 43° (for the element only) will be found as well as the other data such as an $x$ ellipse of 25° with 90 percent foreshortening.

While a preferred embodiment has been described, various modifications and substitutions may be made without departing from the spirit and scope of this invention. Accordingly, it is to be understood that this invention has been described by way of illustration and not limitation.

What is claimed is:

1. Apparatus for use in the preparation of three dimensional drawings comprising:
    a base member having a plurality of scales imprinted thereon, a first one of said scales being commensurate with horizontal angles of view of objects to be drawn, a first plurality of additional scales being oriented perpendicularly with respect to said first one of said scales, at least one of said first plurality of scales being calibrated in accordance with percentage of foreshortening of an axis of the object to be drawn, said base member further carrying a family of curves which cross said first plurality of additional scales and a pair of protractor scales;
    a first transparent overlay, said first overlay carrying second and third scales and a plurality of parallel lines commensurate with indicia on the second of said scales, said first overlay being pivotably attached to said base member at one end of one of said protractor scales; and
    a second transparent overlay, said second overlay carrying fourth and fifth scales and a plurality of parallel lines commensurate with indicia on the fourth of said scales, said second overlay being pivotably attached to said base member at one end of the other of said protractor scales.

2. The apparatus of claim 1 wherein said first overlay is attached to said base member at a first end of said first one of said scales.

3. The apparatus of claim 2 wherein said second overlay is attached to said base member at the second end of said first one of said scales.

4. The apparatus of claim 3 further comprising:
    sixth and seventh scales imprinted on said base member, said sixth and seventh scales extending perpendicularly to said first one of said scales respectively from said first and second ends thereof, said sixth and seventh scales being calibrated in terms of foreshortening of axes of the object to be drawn, said sixth and seventh scales terminating at respective of said protractor scales.

5. The apparatus of claim 4 wherein said family of curves comprises portions of ellipses, said first one of said scales comprising at least in part the major axis of such ellipses.

6. The apparatus of claim 5 wherein said second and third scales on said first overlay are perpendicular to one another and intersect at the point of attachment of said first overlay to said base member.

7. The apparatus of claim 6 wherein said fourth and fifth scales on said second overlay are perpendicular to one another and intersect at the point of attachment of said second overlay to said base member.

8. The apparatus of claim 3 wherein said second and third scales on said first overlay are perpendicular to one another and intersect at the point of attachment of said first overlay to said base member.

9. The apparatus of claim 8 wherein said fourth and fifth scales on said second overlay are perpendicular to another and intersect at the point of attachment of said said second overlay to said base member.

References Cited

UNITED STATES PATENTS

| | | | |
|---|---|---|---|
| 799,609 | 9/1905 | Ludwig | 35—26 |
| 1,506,963 | 11/1925 | Art | 235—85 |
| 1,609,571 | 12/1926 | Olson | 235—89 |

RICHARD B. WILKINSON, *Primary Examiner.*

S. WAL, *Assistant Examiner.*